United States Patent
Smith et al.

(10) Patent No.: US 7,206,390 B2
(45) Date of Patent: Apr. 17, 2007

(54) SIMULATED VOICE MESSAGE BY CONCATENATING VOICE FILES

(75) Inventors: Scott R. Smith, Chicago, IL (US); James E. O'Hara, Winnetka, IL (US); Brian C. Kipp, Gilbert, AZ (US)

(73) Assignee: Extended Data Solutions, Inc., Chicago, IL (US)

( * ) Notice: Subject to any disclaimer, the term of this patent is extended or adjusted under 35 U.S.C. 154(b) by 99 days.

(21) Appl. No.: 10/844,928

(22) Filed: May 13, 2004

(65) Prior Publication Data

US 2005/0254631 A1     Nov. 17, 2005

(51) Int. Cl.
*H04M 1/64*     (2006.01)
(52) U.S. Cl. .............................. 379/88.04; 379/88.17; 704/251
(58) Field of Classification Search ............. 379/88.14, 379/88.22, 93.24, 100.08, 88.27, 69, 88.04, 379/88.17; 704/251, 258
See application file for complete search history.

(56) References Cited

U.S. PATENT DOCUMENTS

| | | | |
|---|---|---|---|
| 5,644,624 A * | 7/1997 | Caldwell | 379/69 |
| 5,737,725 A | 4/1998 | Case | |
| 5,758,323 A | 5/1998 | Case | |
| 5,832,060 A | 11/1998 | Corlett et al. | |
| 6,161,092 A | 12/2000 | Latshaw et al. | |
| 6,411,685 B1 * | 6/2002 | O'Neal | 379/88.14 |
| 6,873,952 B1 * | 3/2005 | Bailey et al. | 704/251 |
| 6,983,249 B2 * | 1/2006 | Sakai | 704/258 |

* cited by examiner

*Primary Examiner*—Gerald Gauthier
(74) *Attorney, Agent, or Firm*—Perry Hoffman

(57) ABSTRACT

Computer-generated personalized voice messages are created by concatenating data files of audio that were prerecorded in the voice of an individual whose live voice is to be simulated during the delivery of the voice message. A call to a person or list of persons is placed by a computer. Common identifiers of each person to be called are read from a data base of data files, and matched with a separate data base containing recorded voice phrases, each of which is a digitization of the individual speaking content corresponding to the identifier—such as the person's first name. The recorded voice phrase audio is concatenated with at least one other audio file, which is a digitization of a message to be delivered to the called person.

29 Claims, 2 Drawing Sheets

SIMULATED VOICE MESSAGE BY CONCATENATING VOICE FILES

BACKGROUND OF THE INVENTION

Computerized calling, or "broadcast voice messaging" systems, are known. Such prior art systems can automatically dial a list of phone numbers, detect the called phone go off hook and then generate a voice message to the called number. Broadcast voice messaging systems typically deliver the same, single voice message to each recipient.

Some broadcast voice messaging systems can personalize the content of the message delivered, using text-to-speech engines. A limitation or short coming of prior art computerized calling systems is that they sound like computers. They are therefore limited in that they can either deliver a single generic message, or the personalized content sounds like a computer. A computer-generated voice message system that delivered personalized, life-like messages would be an improvement over the prior art.

SUMMARY OF THE INVENTION

There is provided a system and method of delivering a voice message by telephone by which a computer concatenates wav files or other types of audio files and plays the concatenated files to a called number in such a way that the resultant audio to the called number sounds as if the caller was speaking personally and directly to the called person.

A caller, such as a political office holder, a celebrity or other known personality, or a candidate for political office, pre-records voice phrases by speaking each phrase into a recording device. Each spoken phrase is digitized and the digitization of the voice rendering stored in a data file. An informational or content message is spoken by the political office holder, a celebrity, or a candidate and it too is digitized and stored in a file.

To deliver a personalized voice message, a computer identifies a person to be called, including his or her phone number and specific identifiers for the person, such as the person's name. The person's phone number is dialed and when the call is answered, the computer concatenates the files having the digitized identifier(s)—such as the person's name, with the file that is the standard message to be delivered. The audio signal that is produced from the concatenated data files, one of which is a pre-recorded voice phrase corresponding to the identifier, another of which is a standard message, the resultant audio message sent to the called number sounds as if the calling party is the political office holder, celebrity, or candidate, addressing the called party directly, as if during a live call by the political office holder, celebrity, or candidate.

DETAILED DESCRIPTION OF THE PREFERRED EMBODIMENT

Figure 1:
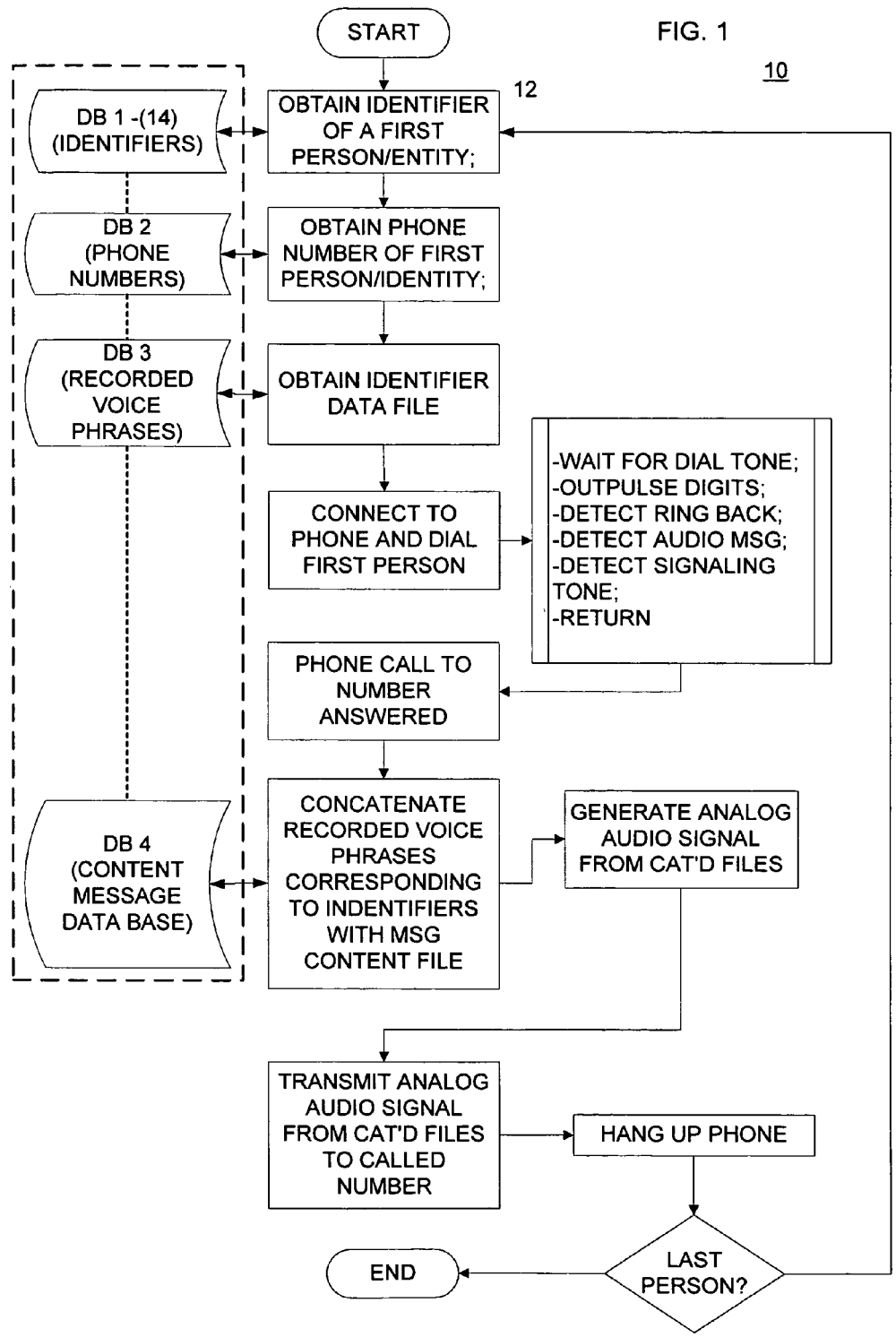
FIG. 1 is a flow chart of a method by which a person's voice can be simulated for voice message broadcast by concatenating voice files.

FIG. 1 depicts steps of a method 10 by which a telephone message can be delivered to one person in the voice of another person by concatenating data files that represent speech of a person who records the telephone message and creating audio from the concatenated data files in such a way that the generated audio impersonates the person who recorded the message. In the preferred embodiment, two or more wav files are concatenated and processed to generate an audio signal that is a voice message to the called person. The voice message to the called person includes words and sentences, i.e., "recorded voice phrases" in the voice of the calling person. The components may include the use of the called person's name, or other identifier. By concatenating wav files that correspond to an identifier of the called person, the computer-generated audio message impersonates a calling person's voice and attributes such that the message sounds as if the message were personally made to the person who was called. The steps of the method 10 depicted in the figures are performed by one or more computers, such as the computer and system shown in FIG. 3.

In step 12, program instructions executed by a processor that cause a processor to read a name or other identifiers of a person to be called from a data base 14 of called party identifiers. An "identifier" of a person to be called can include a person's name. Other identifiers of persons to be called would include a person's address, a postal zip code but could also include a geographic area in which a person lives; his or her age; his or her race; gender; occupation or profession; education level; income; marital status; family status, religion, corporate or group affiliations, special interests and/or purchase habits. All such factors should be considered demographic characteristics of persons to be called.

Table 1 below shows a sample of some identifiers that can be in the first data base DB 1.

TABLE 1

| First Name | City | Election Date | District |
|---|---|---|---|
| John | Chicago | March 16th | 18th |
| Jane | Evanston | April 5th | 24th |
| Scott | Rockford | May 20th | 31st |

A date and time can also be identifiers and term "identifier" should be construed to include all of the foregoing demographic characteristic but also a date and time. Inasmuch as a date and time can be identifiers, they can certainly be repeatedly copied into a data base from which they can be read as is any other identifier. A more expedient way to obtain date and time however is from the computer's internal clock.

After an identifier of a person to be called is obtained in step 12, a phone number for the identified person is obtained in step 16 from a second data base 18 of phone numbers.

Table 2 below shows a sample of first and last names, associated phone numbers and addresses in the second data base DB 2.

TABLE 2

| First Name | Last Name | Address | Phone Number |
|---|---|---|---|
| John | Johnson | 111 Main Street | 312-555-5555 |
| Jane | Jones | 222 Elm Lane | 708-666-6666 |
| Scott | Smith | 333 Oak Avenue | 847-777-7777 |

Although FIG. 1 shows that the data base 14 (DB 1) of identifiers is separate from the data base 18 (DB 2) of phone numbers, these two data bases (DB 1 and DB 2) could be different parts of the same logical data base. In addition, the depiction of DB 1 and DB 2 in FIG. 1 should not be construed to require that DB 1 and DB 2 be on different storage media.

The step 16 of obtaining a phone number for a person identified in step 12 can be readily accomplished using an electronic telephone book. Regardless of how a person was first identified in step 12, e.g., by alphabetic order, address or other demographic characteristic, that person's name can often be found in published or purchased alphabetical telephone directories.

In the preferred embodiment, step 16 is accomplished by looking up a phone number for a person identified in step 12 in a commercially-available electronic telephone directory which also contains the person's name, address and all other identifiers (age, income, interests, etc.).

After one or more identifiers for a person to be called are obtained and the phone number for that person is obtained, in step 20, a recorded voice phrase wav file corresponding to the identifiers by which the person was identified (in step 12) is obtained in step 20 from a third data base 22 of wav files (DB 3). The wav file obtained from the third data base 22 is a digital representation of a person speaking content corresponding to the identifier such that when the wav file is "played" a person's voice is reproduced, which sounds like the person speaking a phrase associated with the identifier.

Table 3 below shows how the third data base DB 3 can be organized.

TABLE 3

| Phrase Filename | Indentifer Field | Matching Indentifier Value |
|---|---|---|
| John.wav | Firstname | John |
| Jane.wav | Firstname | Jane |
| Scott.wav | Firstname | Scott |
| Chicago.wav | City | Chicago |
| Evanston.wav | City | Evanston |
| Rockford.wav | City | Rockford |
| March16.wav | Election Date | March 16th |
| April5.wav | Election Date | April 5th |
| May20.wav | Election Date | May 5th |
| 18th.wav | District | 18th |
| 24th.wav | District | 24th |
| 31st.wav | District | 31st |

If a person's first name was the basis by which he or she was identified, and it was determined that his first name is "John," the Phrase Filename entry for the identifier "John" will either be an audio file, such as a wav file, or a pointer to where a corresponding wav file can be located in memory.

If for example, the identifier used step 12 is a person's first name, the data file obtained in step 20 from the third data base 22 will be a wav file that is a digitization of someone speaking the identified person's first name. If the person to whom a message is to be delivered is named "John" and the person who is ostensibly calling for "John" is a candidate for political office, the wav file obtained in step 20 from the third data base 22 will be the candidate saying the name "John" in the candidate's own voice. If the person ostensibly calling "John" is a celebrity, the wav file obtained in step 20 will be the celebrity saying "John" in the celebrity's own voice.

In some instances, the third data base 22 of recorded voice phrases will not have a file corresponding to a given identifier. Inasmuch as the inventive concept disclosed and claimed herein is directed to simulating natural voice by concatenated voice files, if an identifier for a person or persons is not available in step 20, the method is aborted for that identifier. If at step 20 there is no identifier, program control should therefore stop at step 20, or branch back to step 12 for the next person to be identified in step 12. If there is a data file in the third data base 22 (DB 3) for the person who was identified in step 12, the rest of the method 10 steps can be completed. Program control thereafter proceeds to step 24.

In one embodiment, "generic voice phrases" can be inserted if there is no match between an identifier and digitized rendition of the identifier. If the person's name is not common, a substitute wave file will be substituted which, when inserted, continues to simulate natural voice. For instance, the greeting "Hi John" would be substituted with "Hi"; the phrase "I will work to add jobs through small business incentives and lower taxes for all citizens, especially those living in the 24th District." will be substituted with "I will work to add jobs through small business incentives and lower taxes for all citizens." The latter is accomplished by substituting a short, silent wave file for the personalized clip. ("especially those living in the $24^{th}$ District" will be "_" . . . and the resulting message still sounds natural.)

At step 24, a telephone call to the identified person is attempted by the computer. As is known, several steps are performed to automatically place a call.

FIG. 1 shows step 26 as having several separate steps that need to be performed. The computer placing the call must have some control over the telephone or telephone line by which the call will be placed. In the case of plain old telephone service or POTS, there is a finite amount of time that elapses after the phone goes "off hook" and a dial tone is detected. In step 26, the computer will wait for a dial tone, after which it will out pulse the phone number being called.

The "ring back" is a tone provided to a calling party to inform the calling party that the called number telephone is detected as ringing. After the ring back is detected in step 26, the called number will usually be answered, by a telephone answering system or a live person. The computer detects when the called number is answered, usually by the called number going off hook but also by the cessation of the ring back tones, after which the computer needs to determine whether the number was answered by a machine or a live person.

In the preferred embodiment, the method depicted in FIG. 1 determines whether the number was answered by a machine or live person and produces a slightly different voice message for each case, by concatenating different recorded voice phrases and/or standard message content.

Pre-recorded speech used in voice mail systems and the recorded audio announcement commonly used with answering machines and the live speech of a live human can be differentiated by a computer using methods that are well-known in the art. The differentiation of a live person's voice from a machine is not germane to the invention disclosed and claimed herein.

At step 30, after the called number is determined to have been answered in step 28, program control proceeds to step 30 whereat the computer concatenates the data file obtained in step 20, with a second data file obtained from a content message data base 32 (DB 4). For purposes of claim construction, the term "concatenate" should be construed to mean a logical joinder or linkage of the two data files, both of which are digitized speech files, such as wav files, of the voice of a person who is ostensibly placing a call to the person identified in step 12.

Table 4 below shows a sample of content messages that are digitized and stored in the fourth data base DB 4.

TABLE 4

| Message Filename | Message Description | Message Content |
|---|---|---|
| ThisIsTim.wav | Message introducing Candidate | "This is Tim Simpson, candidate for U.S. Senate." |
| JobsTaxes.wav | Message appealing to increasing job growth and lowering taxes | "As your next US Senator, I will work to add jobs through small business incentives and lower taxes for all citizens." |
| Thanks.wav | Message thanking person | "I would appreciate your vote. Thanks." |

Inasmuch as it is an object of the invention to simulate a person's actual voice, it is important that data files that contain data that represents speech be processed appropriately so that the speech that is rendered from data files sounds natural. Clarifying the term "concatenate," it should be understood that the first data file that was identified in step 20 will produce speech when it's processed into an audio signal. A content message obtained in step 30 from a data base will produce recognizable speech when it's processed. When these two audio signals are played in sequence, i.e., one after the other, the resultant audio signal should sound as if it was spoken by the person whose voice is being impersonated by the computer's concatenation of different data files, each of which represent one or more words or phrases spoken by the calling party.

In step 34, after the telephone call is answered and after the data files that will comprise a message to be sent are concatenated, an audio signal, produced from concatenated data files, is transmitted to the called person over the telephone link that extends to the called person's telephone or answering system.

Table 5 below shows a phone number of a person to be called, files that are concatenated from the data bases and finally, a text representation of what the spoken message from the concatenated files would include when it's transmitted to the called person.

TABLE 5

| Phone Number | Concatenation | Resulting Message Content |
|---|---|---|
| 312-555-5555 | 1. John.wav<br>2. ThisIsTim.wav<br>3. Chicago.wav<br>4. JobsTaxes.wav<br>5. 18th.wav<br>6. March16.wav<br>7. Thanks.wav | "Hi John. This is Tim Simpson, candidate for US Senate. I'm calling Chicago residents today to introduce myself. As your next U.S. Senator, I will work to add jobs through small business incentives and lower taxes for all citizens, especially those living in the 18th District. Your election day is March 16th. I would appreciate your vote. Thanks." |

For purpose of claim construction, the term "transmitted" should be construed to include any method by which the audio created from the data files is sent to the called number. In the case of audio that is stored as a wav file, an analog signal, i.e., an audio signal, is generated from a wav file using techniques that are known in the art. In the case of a POTS call, audio from the wav files is generated by the computer and output to the telephone line onto which the DTMF tones that represent the called number were transmitted. The analog signal from the wav files is sent to the called number via the telephone network over which the call was routed. In the case of a call placed from a cellular or other wireless network, or even Voice Over Internet Protocol or VoIP, the term "transmitted" should be construed to include the digital representations of the audio signal created from the wav files but which is digitally processed during the course of a call handled by a wireless telephone service or a data network, such as the Internet.

In the preferred embodiment, one identifier of a first person obtained in step 12 was a person's name. Both first and last names are obtained in step 12 so that in step 20, the called person's first name can be used when the message is transmitted in steps, 30, 34 and 36.

Part of step 20 includes a decision (not shown for clarity) whether to obtain a first name or a last name. In the preferred embodiment, common names are stored in the data base 22 of recorded voice phrases. Whether a name is "common" and therefore in the third data base 22 will depend on various factors including the statistical frequency at which a name is used in a population. So-called "recurring" identifiers, i.e., those that appear over some determined number of times, are considered "common."

Some people can have a common first name, but an uncommon last name. Other people can have a common last name but an uncommon first name. Yet other people might have uncommon first and last names or common first and last names. In step 20, the most common of two or more names of a person is selected for use in the subsequent steps. If a last name of a person is located but no first name, the message that is assembled in step 30 will be selected as one to be used when addressing a person by last name. If a first name of a person is located in step 20 but no last name, the message assembled in step 30 will be selected as one to be used when addressing a person by first name.

As is well-known, many people initiate speech to an answering machine or voice mail system with the term "hello" or other salutation, followed by an identifier for the person being called, followed by the content or information of their message. An exemplary sequence or template of utterances of a person leaving a message can be represented as follows:

<SALUTATION><IDENTIFIER><CALLER IDENTIFIER><MESSAGE CONTENT>

The words "hello," "greetings," and "hi" are common salutations that many people use in the course of leaving a voice message. The called party's first name is an identifier obtained in step 12 of FIG. 1.

Most people identify themselves to a called party, before they leave the substance of their message. The aforementioned "caller identifier" utterance represents that a caller might identify himself or herself to the called party, before leaving the "message content" utterance. The "caller identifier" utterance can be part of the "message content" utterance, but it can also be a separate wav file that is inserted or "dropped in" to the concatenated data files in order to customize or more realistically impersonate a person's actual speech.

Using the foregoing template, a first person can be impersonated as calling a second person by playing an audio signal created from a file that is a digitization of the first person speaking the word "hello" followed by an audio signal created from another file that is a digitization of the first person speaking a name for the person being called.

For example, a candidate can record himself speaking a common name, as he might do when placing a call to such a person. As the candidate pronounces a name, it is recorded, then digitized and stored. By recording hundreds or even thousands of names, a library or data base of recorded names, corresponding with the names of the individuals to be called, can be used to impersonate the candidate speaking to the called party.

A drop-in can also be added to a digitized message that has been stored in the content message data base 32. An example of such a drop in would include a date/time drop in by which the output audio signal in the calling person's voice also included the calling person "stating" the current date and/or time on which the call was actually made. Adding such a drop in message increases the likelihood that the called party will believe that a live call has actually been placed by the calling party.

It should be apparent from the foregoing that a candidate for political office can record himself saying various salutations, such as "hello" or "greetings" or "hi." In addition, the candidate can record himself identifying himself and can also record himself delivering a voice mail message to prospective voters on issues in the impending election.

Once the aforementioned data files are created and stored, they can be strung together in sequence according to predetermined rules of usage such that when they are used to create an audio signal, they sound as if they were spoken or uttered in real time by the person whose voice was recorded, digitized and the samples stored. Such a message can include a salutation from the calling party such as "hello" followed by an appropriate greeting, such as "mister smith." An identifier, e.g., "this is Senator Bill Stephens" that either precedes or which forms part of the message, can all be strung together and transmitted to the voice mail, answering machine or even to a live person.

After a salutation is rendered by the computer, e.g., "Hello" and after the called person's name is rendered by the computer "John" the calling party can identify himself to the called party, e.g., "this is Senator Bill Stephens" using a pre-recorded drop-in file that is a representation of Senator Bill Stephens, in his own voice. The "message content" can follow the "caller identifier" audio to make the call sound realistic as if it had been left by the person in whose voice the audio messages were left, or at least an impersonator of the actual person in whose voice the audio files were made.

In order to render life-like voice from the data files stored in the various data bases, salutations, identifiers, caller identifiers and message content files have to be presented as if they were being uttered by the person in whose voice they were made. If for example the aforementioned "recorded voice phrases" of a computer generated impersonation were a well-known celebrity or a well-known political office holder or a candidate for political office, the manner in which the data files are strung together will require timing and level control to faithfully impersonate the calling person.

In the preferred embodiment, the delivery of various utterances from data files is governed by various "rules" that specify various parameters that help to make computer-generated speech sound more life-like. A speaker's cadence is but one characteristic that is accommodated using "rules" that determine how a simulated voice can impersonate a live person.

"Rules" are used to specify the delivery of audio in order to make the audio signal sound more lifelike. "Rules" can also be used to identify which message to deliver from a plurality of pre-recorded and digitized message content.

A feature of the disclosed and claimed invention is the ability to select a message content based on the identifier and/or demographic characteristics. For example, a celebrity whose voice is well known can record a message for one particular company in one geographic area but record a separate message for advertising targeted for the same company in a different region. Being able to build customized messages from stock data files greatly enhances the ability to deliver customized messages that accurately imitate a person.

While the embodiment described above contemplates placing calls one-at-a-time, at least one alternate embodiment includes the step of calling multiple persons at the same time, from a phone listing.

Instead of identifying a single person in step 12, multiple parties to be called in step 12 by different identifiers. For example, step 12 can identify all male voters in a certain geographic region, whose name is "John Doe." Upon a determination that there are multiple "John Does" phone numbers for "John Doe" can be retrieved in step 16 followed by the retrieval of a data file for the name "John" or "Doe" or "John Doe."

In steps 24, 26 and 28, calls are placed to several different "John Does." As the calls are answered, the same message, e.g., "hello" "John Doe" "this is Senator Bill Stephens calling . . . " is transmitted to each phone number. A drop-in date and/or time adds realism to the call as does a content message that is focused to the "John Does" that were called.

It should be apparent from the foregoing that the invention disclosed and claimed herein can be used to automatically place phone calls to prospective voters or constituents of elected officials. As such, it can be a valuable campaign tool by automatically placing calls, which upon receipt, generates an impersonation of a candidate speaking to a voter or constituent using the first-person, i.e., addressing a person by name by the calling person.

While actual speech is preferred, those of skill in the art will appreciate that a candidate's voice or a celebrity's voice can be impersonated. The data files of recorded voice phrases and the data files of message content can therefore be pre-recorded albeit using an impersonation of a person who is supposed to be speaking. When the various data files are concatenated and played back, the resultant audio might be a sufficiently accurate reproduction of the calling party to quell suspicion that the call was computer generated.

Celebrity voices or impersonations thereof can be used as well. Similarly, the content message to be delivered can be a commercial message as well as a public service message. The concatenation of wav files or other types of audio files to replicate a celebrity speaking to a person by name can be effective.

While the preferred embodiment used wav files to store and produce analog audio signals, other file types can be concatenated as well. Some file types include those listed in Table 6 below. For claim construction purposes, the term "data file" should be construed to include any one or more of the file types in Table 6 as well as the wav files mentioned above.

TABLE 6

8-bit signed SAM (.sam)
64-bit doubles RAW, DBL (.raw, .dbl)
A-Law and mu-Law (.wav)
ACM waveform (.wav)
Amiga IFF-8SVX (.iff, .svx)
Apple AIFF (.aiff, .aif, .snd)
ASCII Text Data (.txt)
AVR (.avr)
Cool Edit or Audition Loop (.cel)
Compact Disc Audio (.cda)
Creative Sound Blaster (.voc)
Dialogic ADPCM (.vox)
DiamondWare Digitized (.dwd)
Dolby AC3 (.ac3)

TABLE 6-continued

DVI/IMA ADPCM (.wav)
GSM 6.10: (.gsm, .au.gsm)
Microsoft ADPCM (.wav)
MP3 (.mp3)
MP3PRO (.mp3)
MPEG audio, layer 1, 2, or 3 (.mpa,
.mp, .mp2, .m1a, .m2a, .mpg,
.mpeg, .swa)
NeXT/Sun platforms (.au, .snd)
May include
Mu-Law 8-bit, A-Law 8-bit,
G.721 ADPCM 4-bit, and Linear PCM
PARIS: (.paf)
PSION sound: (.wve)
PCM, RAW Data (.pcm, .raw)
QuickTime Movie (.mov)
Turtlebeach SampleVision (.smp)
Windows Media Audio 9 (.wma)
Windows Media Audio 9 Professional
(.wmp)
Windows PCM - 6 channel (.wav)
Windows Pulse Code Modulation
(PCM) data (.wav)

Figure 2:
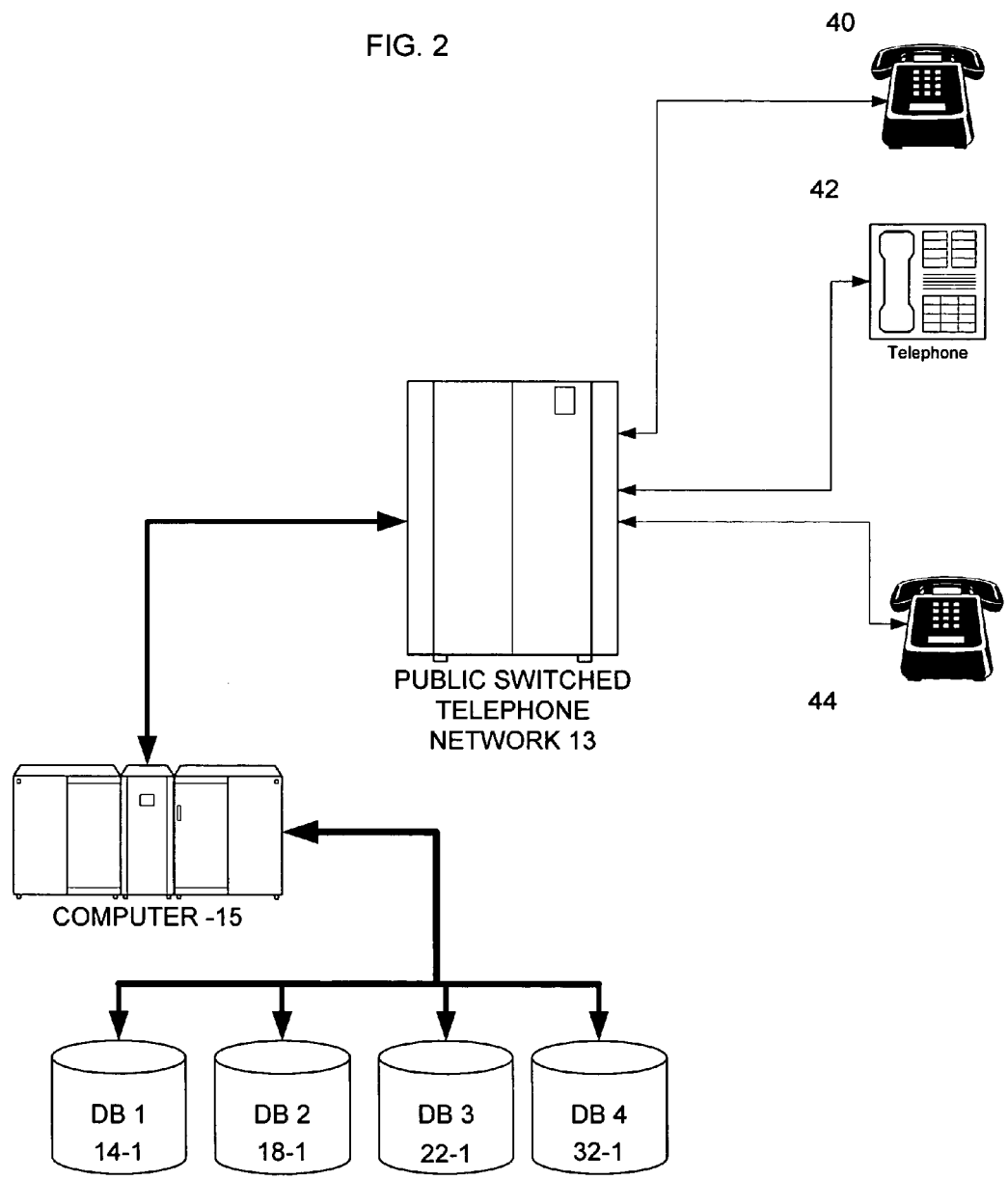
FIG. 2 is a block diagram of an apparatus that simulates a live person leaving a voice mail message by concatenating audio files and generating audio from them.

FIG. 2 depicts an apparatus for delivering a telephone message to a first person, at a first telephone number, in the voice of a second person. A computer 15 is operatively coupled to four different storage devices, identified by reference numerals 14-1, 18-1, 22-1 and 32-1 corresponding to the four data bases DB 1, DB 2, DB 3 and DB 4 above.

The first storage device 14-1 stores a data base DB 1 that includes the names or other identifiers of persons to be called. The second storage device, 18-1, stores a data base DB 2 of telephone numbers for each of the persons in the first data base DB 1. A third storage device 22-1 stores data files consisting of recorded voice phrases, each of which is a digitization of a person speaking content corresponding to the identifiers in the first data base DB 1. A fourth storage device stores a fourth data base of digitized content messages to be delivered to a person being called.

The computer 15 is shown coupled to the public switched telephone network or PSTN 13. When a phone number is determined from the second data base 18-1, the computer 15 can place a call to that phone number by generating the DTMF tones of the phone number and sending the tones to the PSTN. Of course, a communication other than the PSTN could be used as well. For purposes of claim construction, a "communication network" should be construed to include the PSTN but also include cellular and the Internet over which voice communication can occur via VoIP.

As set forth above, when a call placed to one or more phones 40, 42 and 44 is answered, program instructions stored in the memory of the computer 15 cause the computer to perform the steps shown in FIG. 1 In other words, the stored program instructions cause the computer to obtain a phone number of an identified person; obtain the recorded voice phrases in the data base 22-1 corresponding to the person having the phone number, concatenate the recorded voice phrases with one or more content message files from the fourth data base 32-1 and produce a voice message that sounds as if it is spoken by the second person and addressing the first person directly.

It should be apparent that by using the foregoing method and apparatus, a simulated voice message can be delivered to a person, which sounds as if the message were personally directed to the recipient. When the audio files from which the message is created are in the voice of a celebrity or other known person, such as a candidate for office, the messages delivered by the system have a significantly greater impact on the recipient that prior art computer-generated messages.

What is claimed is:

1. A method of automatically delivering a telephone message to a first person in a voice of a second person by concatenating digital files, a content of which are digital representations of the second person's voice, such that an audio signal is produced from the concatenated files, which is substantially identical to the second person speaking to the first person, the method comprising:
   obtaining at least one identifier of a first person from a data base;
   obtaining a phone number for the first person from a data base;
   obtaining from a data base, a first data file, the contents of which is a digitization of the second person speaking a recorded voice message relating to the identifier of the first person;
   automatically originating a telephone call from a computer, to a called number at the phone number for the first person;
   detecting by a computer, the telephone call as being answered, and
   after the telephone call is answered, transmitting to the called number, an analog signal generated by a computer, by concatenating the first data file and a second recorded voice message file and generating an audio signal from the concatenated data files, the second data file being a digitization of a voice message to be conveyed to the first person, the concatenated data files being digitized speech of the second person such that the audio signal generated from the concatenated files is substantially identical to the second person's voice directed to the first person, as a personalized voice message broadcast.

2. The method of claim 1 wherein the step of obtaining an identifier of a first person from a data base, includes a step of obtaining a person's name from a data base.

3. The method of claim 1 wherein the identifier is a reoccurring identifier for a plurality of persons.

4. The method of claim 1 wherein the identifier is at least one of:
   a common name;
   a demographic characteristic;
   a political party affiliation or membership;
   affiliation with a particular religion;
   a voting history; a geographic area;
   an affiliation with or to an organization, corporation or group;
   a purchase of a particular product or service; and
   a known interest or hobby.

5. The method of claim 2 wherein the step of determining a name includes a step of determining the name to be a common name.

6. The method of claim 5 wherein the common name is a common first name.

7. The method of claim 5 wherein the common name is a common surname.

8. The method of claim 6 wherein the step of transmitting an analog signal includes the step of generating an analog electrical signal that produces audio at the called number that includes the common first name.

9. The method of claim 7 wherein the step of transmitting an analog signal includes the step of generating an analog electrical signal that produces audio at the called number that includes the common surname.

10. The method of claim 1 wherein the step of generating an analog signal by a computer, includes the step of: concatenating data files of digitized speech according to predetermined rules on how the identifier should be rendered as speech of the second person.

11. The method of claim 1 wherein the step of, transmitting to the called number, an analog signal generated by a computer from at least first and second concatenated data files, includes a step of concatenating a digitized speech file that represents the second person enunciating a salutation.

12. The method of claim 1 wherein the second data file is comprised of a plurality of data files.

13. The method of claim 1 including a step wherein the second data file is selected from a plurality of files, each of which produces a different audio signal that conveys different content.

14. The method of claim 1 wherein automatically originating a telephone call from a computer includes originating a plurality of calls to a plurality of phone numbers substantially simultaneously and wherein the step of transmitting to the called number, an analog signal includes the step of transmitting the analog signal to a plurality of the called numbers that answered.

15. The method of claim 1 wherein the second person is a candidate for political office.

16. The method of claim 15 wherein at least one of a first and second concatenated data files is a digitization of a political message, spoken by a political candidate, such that the audio electrical signal produced at the called phone number by the concatenated data files replicates a voice of the political candidate speaking to the first person.

17. The method of claim 15 wherein at least one of the first and second concatenated data files is a digitization of a political message spoken using a voice that is substantially identical to the voice of a political candidate such that the audio electrical signal produced at the called phone number by the concatenated data files substantially replicates the voice of the political candidate, speaking to the first person.

18. The method of claim 1 wherein at least one of a first and second concatenated data files is a digitization of a commercial message, spoken by the celebrity, such that the audio electrical signal produced at the called phone number by the concatenated data files replicates a voice of the celebrity speaking to the first person.

19. The method of claim 16 wherein at least one of the first and second concatenated data files is a digitization of a commercial message spoken using a voice that is substantially identical to a voice of the celebrity such that the audio electrical signal produced at the called phone number by the concatenated data files substantially replicates the voice of the celebrity, speaking to the first person.

20. The method of claim 1 wherein the concatenated data files are WAV files.

21. The method of claim 1 wherein the step of automatically originating a telephone call from a computer includes the step of obtaining a phone number of a first person from the data base of persons.

22. The method of claim 1 wherein a first data base of persons is a data base of voters.

23. The method of claim 1 wherein said analog signal is generated from the digitization of the voice message by concatenating the first data file and the second data file and generating the audio signal from the concatenated data files substantially identical to the second person, the speech of the second person representing an individual, celebrity, political office holder, or candidate addressing the first person directly in a live call delivered in its entirety as a single personalized, life-like message.

24. The method of claim 1 wherein the data base of persons is a data base of prospective customers.

25. The method of claim 1 wherein the step of automatically originating a telephone call includes placing a telephone call using cellular or other wireless communication service.

26. The method of claim 1 wherein the step of automatically originating a telephone call includes a step of placing a telephone call using Voice Over Internet Protocol.

27. The method of claim 1 wherein the step of automatically originating a telephone call includes determining a time of day when a telephone call is expected to be directed to a voice recording device.

28. An apparatus for delivering a telephone message to a first person in the voice of a second person comprising:
a computer that is operatively coupled to:
   a) a first data base having identifying characteristics of at least a first person and a phone number associated with the first person comprising common identifiers of each person to be called;
   b) a second data base of recorded voice phrases comprising digital audio files, each digital audio file being a digitization of the second person speaking phrases associated with the identifying characteristics of the first person wherein common identifiers of the first data base are matched with the recorded voice phrases, each of which is a digitization of the individual speaking content corresponding to the common identifiers;
   c) a communication network;
   d) a third data base, storing at least one second audio file, which is a digitization of a voice message, spoken by the second person; and
   e) memory, storing computer program instructions, which when they are executed, cause the computer to:
      i) obtain a first telephone number of a first person, from the first data base
      ii) determine if there is a digitization of the phrases associated with the identifying characteristics of the first person;
      iii) if there is a digitization of the phrases associated with the identifying characteristics of the first person, then concatenate the first digital audio file with the second audio file;
      iv) place a call to the first telephone number;
      vi) when the call is answered, generate a voice message from the first digital audio file and the second audio file to produce a voice message that sounds as if it is spoken by the second person and addressing the first person directly.

29. A method of automatically delivering a telephone message to a first person in a voice of a second person by concatenating digital files, a content of which are digital representations of the second person's voice, such that an audio signal is produced from the concatenated files, which is substantially identical to the second person speaking to the first person, the method comprising:
   obtaining at least one identifier of a first person from a data base;
   obtaining a phone number for the first person from a data base;

obtaining from a data base, a first data file, the contents of which is a digitization of the second person speaking a recorded voice message relating to the identifier of the first person;

automatically originating a telephone call from a computer, to a called number at the phone number for the first person;

detecting by a computer, the telephone call as being answered, and after the telephone call is answered, transmitting to the called number, an analog signal generated by a computer, by concatenating the first data file and a second recorded voice message file and generating an audio signal from the concatenated data files, the second data file being a digitization of a voice message to be conveyed to the first person, the concatenated data files being digitized speech of the second person such that the audio signal generated from the concatenated files is substantially identical to the second person's voice directed to the first person, wherein automatically originating a telephone call from a computer includes originating a plurality of calls to a plurality of phone numbers substantially simultaneously and wherein the step of transmitting to the called number, an analog signal includes the step of transmitting the analog signal to a plurality of the called numbers that answered.

* * * * *